US00RE43545E

(19) United States
(12) Reissued Patent
Cohen

(10) Patent Number: US RE43,545 E
(45) Date of Reissued Patent: Jul. 24, 2012

(54) VIRTUAL SKYWRITING

(75) Inventor: Michael Cohen, Seattle, WA (US)

(73) Assignee: Microsoft Corporation, Redmond, WA (US)

(21) Appl. No.: 13/174,576

(22) Filed: Jun. 30, 2011

Related U.S. Patent Documents

Reissue of:
(64) Patent No.: 7,966,024
Issued: Jun. 21, 2011
Appl. No.: 12/242,560
Filed: Sep. 30, 2008

(51) Int. Cl.
*H04W 4/02* (2009.01)

(52) U.S. Cl. ..... 455/456.3; 455/414.1; 345/636; 382/190

(58) Field of Classification Search ..... 382/159, 382/165, 170, 181; 715/230–233; 455/404.1–404.2, 455/414.1–414.4, 440, 456.1–457
See application file for complete search history.

(56) References Cited

U.S. PATENT DOCUMENTS

| | | | | |
|---|---|---|---|---|
| 6,377,793 | B1 * | 4/2002 | Jenkins | 455/412.1 |
| 6,850,695 | B1 | 2/2005 | Sampsell | |
| 7,032,182 | B2 | 4/2006 | Prabhu et al. | |
| 7,234,106 | B2 | 6/2007 | Simske | |
| 2005/0058435 | A1 | 3/2005 | Chung et al. | |
| 2005/0107952 | A1 * | 5/2005 | Hoshino et al. | 701/211 |
| 2005/0147298 | A1 * | 7/2005 | Gallagher et al. | 382/173 |
| 2006/0165291 | A1 * | 7/2006 | Atsumi et al. | 382/190 |
| 2006/0268007 | A1 | 11/2006 | Gopalakrishnan | |
| 2007/0024527 | A1 * | 2/2007 | Heikkinen et al. | 345/9 |
| 2007/0032244 | A1 * | 2/2007 | Counts et al. | 455/456.1 |
| 2007/0081090 | A1 | 4/2007 | Singh | |
| 2007/0104348 | A1 * | 5/2007 | Cohen | 382/100 |
| 2007/0162942 | A1 | 7/2007 | Hamynen et al. | |
| 2007/0242131 | A1 * | 10/2007 | Sanz-Pastor et al. | 348/14.02 |
| 2008/0064438 | A1 | 3/2008 | Calvet et al. | |
| 2008/0122871 | A1 | 5/2008 | Guday | |
| 2008/0137958 | A1 | 6/2008 | Wang et al. | |
| 2009/0054084 | A1 * | 2/2009 | Buhrke et al. | 455/456.3 |

OTHER PUBLICATIONS

Haritaoglu, Ismail, "Scene Text Extraction and Translation for Handheld Devices", Proceedings of the 2001 IEEE Computer Society Conference on Computer Vision and Pattern Recognition, vol. 2, Dated: 2001, pp. II-408-II-413.

* cited by examiner

*Primary Examiner* — Ajit Patel
*Assistant Examiner* — Erica Navar

(57) ABSTRACT

Users with mobile computing devices author skywriting and submit them to a virtual skywriting service. A mobile computing device having wireless network access is configured to capture a digital image of a real world scene including sky. The image is captured while the mobile computing device is in a geographical location or area. While the mobile computing device is still in the geographical location or area, it transmits via the wireless network a request for virtual skywriting. The request is received by a skywriting service that obtains or determines the geographical location/area that the computing device is in or near. The skywriting service selects a skywriting from among the previously submitted skywritings; the skywriting may be selected based on its having been entered at or associated with the geographical location. The mobile device receives the virtual skywriting from the service and displays a version of the digital image with the virtual skywriting added to the sky in the version of the digital image. Either the service or the mobile device may render the skywriting onto the image. Various effects may be applied in rendering the skywriting to give it realistic or vapor-like appearance.

18 Claims, 5 Drawing Sheets

AMENDED

AMENDED

AMENDED

AMENDED

| ID | timestamp | userID | groupID | content | location ID |
|---|---|---|---|---|---|
| 001 | 1/1/2008 | 1001 | 234 | KILROY WAS HERE | 256 (SEATTLE) |
| 002 | ... | ... | ... | ... | ... |

AMENDED

AMENDED

VIRTUAL SKYWRITING

Matter enclosed in heavy brackets [ ] appears in the original patent but forms no part of this reissue specification; matter printed in italics indicates the additions made by reissue.

BACKGROUND

Techniques related to virtual skywriting are discussed below. There have been proposals for allowing users of mobile devices to create and view virtual graffiti. Such proposals have taken an approach of allowing a user to create virtual graffiti and "pin" it to a particular real world object such as a wall, building, etc. However, this approach of virtual shared graffiti has certain limitations. Virtual graffiti may be accessible only to those in the vicinity of a virtual graffiti collection point. Also, there may be difficulties in recognizing, in an image, the object that graffiti is pinned to. In view of these shortcomings, embodiments described below relate to allowing users of mobile devices to create and view virtual skywriting.

SUMMARY

The following summary is included only to introduce some concepts discussed in the Detailed Description below. This summary is not comprehensive and is not intended to delineate the scope of the claimed subject matter, which is set forth by the claims presented at the end.

Users with mobile computing devices author skywriting and submit them to a virtual skywriting service. A mobile computing device having wireless network access is configured to capture a digital image of a real world scene including sky. The image is captured while the mobile computing device is in a geographical location or area. While the mobile computing device is still in the geographical location or area, it transmits via the wireless network a request for virtual skywriting. The request is received by a skywriting service that obtains or determines the geographical location/area that the computing device is in or near. The skywriting service selects a skywriting from among the previously submitted skywritings; the skywriting may be selected based on its having been entered at or associated with the geographical location. The mobile device receives the virtual skywriting from the service and displays a version of the digital image with the virtual skywriting added to the sky in the version of the digital image. Either the service or the mobile device may render the skywriting onto the image. Various effects may be applied in rendering the skywriting to give it realistic or vapor-like appearance.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

[FIG. 6 shows how geographical locations can be used for providing virtual skywriting.]

DETAILED DESCRIPTION

Embodiments discussed below relate to virtual skywriting. Discussion will begin with description of some of the goals of a virtual skywriting system. A system for enabling virtual skywriting will then be described. This will be followed by description of various processes and embodiments for creating, storing, finding, applying, and displaying skywriting.

Figure 1:
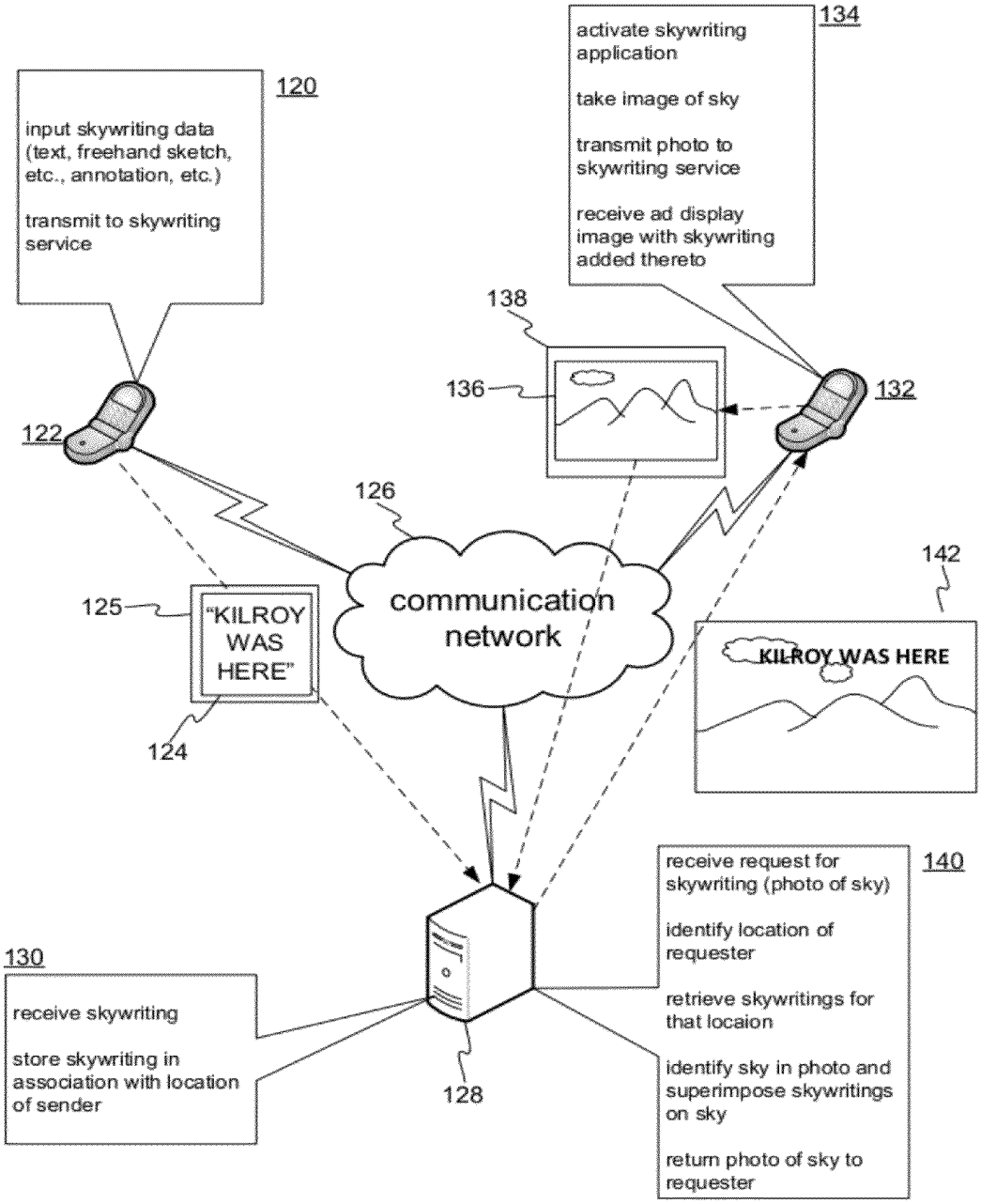
FIG. 1 shows an example [of] *system for* virtual skywriting [in use].

[FIG. 1 shows an example of virtual skywriting 100 in use.] An objective of some embodiments described herein is to allow a user of a mobile device [102] to view an image [104] of the local sky (in real world scene [105] from the viewpoint of the mobile device [102]) with virtual skywriting [100] layered or superimposed on the image [104]. While an image [104] captured by the mobile device [102] of the actual local sky is used in one embodiment, in other embodiments the image to be displayed may come from other sources such as stored images correlated (perhaps loosely) with the time and location of the mobile device [102]. As used herein, a mobile device can be any type of computing device that is somewhat portable, preferably equipped with means for wireless communication, a display, user input mechanisms such as buttons, a mouse or touch sensitive screen, etc. A mobile device might be, for example, a cell phone, a PDA, a laptop, a handheld GPS, and so on.

Of interest is that in some embodiments the virtual skywritings can be associated with geographical areas of widely varying size and location, thereby allowing users in the same area to see on their respective mobile devices the same virtual skywriting in roughly the same sky. For example, [referring to FIG. 1,] if [another] *a second* user perhaps blocks or miles away *from a first user* were to take a photo of the sky and request skywriting for same, that [other] *second* user could see on his or her mobile device approximately the same skywriting [100] displayed on the nearby mobile device [102] *of the first user* (but superimposed on the [use's] *second user's* own image of the local sky). While the second user might see the skywriting rendered differently, fitted to a different view of the local sky, etc., the same underlying skywriting content (albeit perhaps rendered differently, e.g., larger, brighter, with a different shape) may be viewed by both [viewers] *users*. Furthermore, despite being perhaps separated by miles, one of the users can "write" to the local sky (i.e., input skywriting) and the other user can then "see" the skywriting superimposed on nearly the same local sky.

Figure 2:
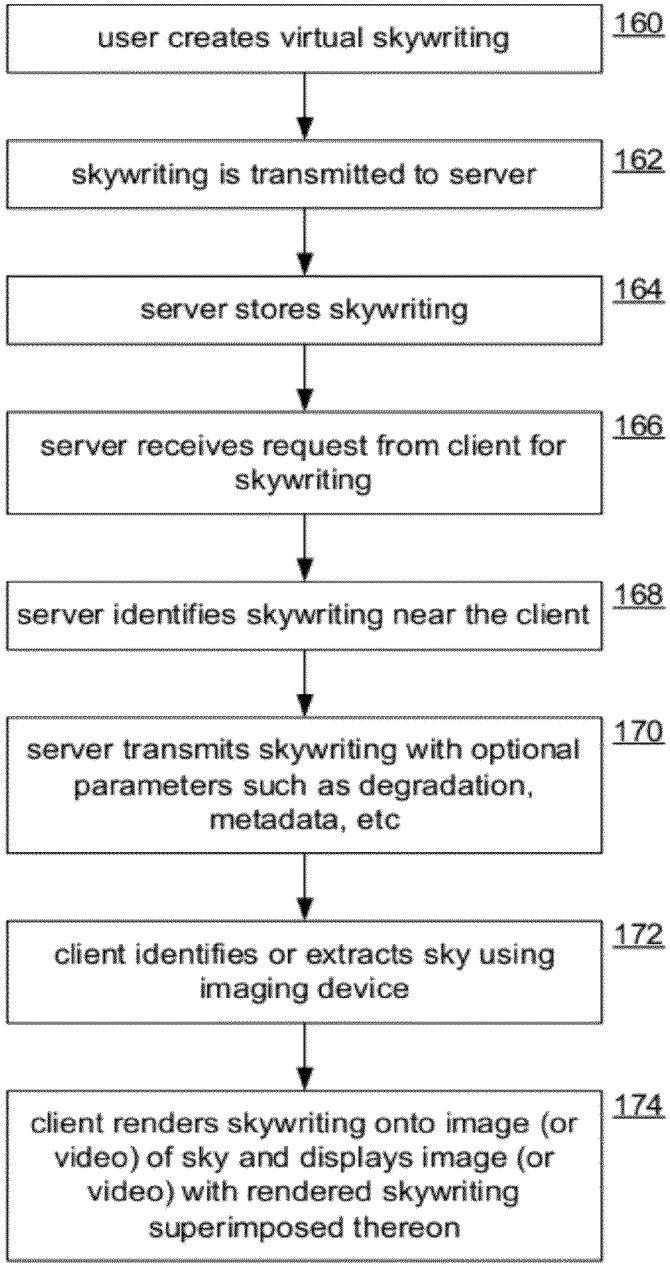
FIG. 2 shows [an example system for] *a general process for creating and displaying* virtual skywriting.

[FIG. 2] *FIG. 1* shows an example system for virtual skywriting. At step 120 a mobile device 122 is used to create virtual skywriting content. A user inputs skywriting data such as text, freehand drawing, or even multimedia such as an image or video. In the example of [FIG. 2] *FIG. 1*, the authored skywriting is text 124. The skywriting text 124 is included with a transmission 125 via a communication network 126 (e.g., a wireless network) to a central server or service 128 (for brevity referred to hereafter as service 128). The service 128 may be a cloud-type service where a number of federated servers cooperate to provide a service over a wide geographic area in the form of an API or an HTTP-based service, for example. In one embodiment the transmission 125 of skywriting text 124 includes indicia of the geographic area or location of the mobile device 122. Such information might be derived from user input (the user inputs the location), from an on-board GPS of the mobile device 122, from cell-phone tower information, GSM repeater triangulation, or any other techniques. In other embodiments, location information may be determined or obtained by the service 128. The geographic location information associated with the newly created skywriting 124 could be in the form of geographic coordinates, an identifier of a grid element (see [FIG. 6] *FIG. 5*) in which the mobile device 122 is located, the name of a county or city, a zip code, a user-defined bounded region, and so on.

Regardless of how the service 128 obtains information about the location or locale of the mobile device 122, the service 128 performs a process 130 of receiving the virtual skywriting text 124 and storing the skywriting in association with indicia of the location, region, etc. of the skywriting text 124. As will be discussed with reference to [FIG. 4] *FIG. 3*, other information may be associated with stored skywritings, for example user IDs, group IDs, timestamps, etc. Of course the same process of generating and submitting virtual skywritings may be performed for skywritings submitted by many other mobile devices at any number of other geographical locations.

Having stored the virtual skywriting text 124 and associated metadata, the service 128 is then able to serve the skywriting to other mobile devices. For example, if another mobile device 132 requests skywriting, the service 128 is able to provide the skywriting text 124 to the mobile device 132. This may involve the mobile device 132 performing a process 134 of first activating a local skywriting application, such as a stand-alone application, a browser plug-in, etc. The mobile device 132 may capture an image 136 of a local scene, the image 136 including at least some of the sky as seen from the site of the mobile device 132. In one embodiment, the image 136 included in a request 138 transmitted to the 128 via communication network 126. In other embodiments, described later, the request 138 for skywriting does not include an image.

The service 128 performs a process 140 for handling requests. After receiving the request 138, the service 128 obtains or identifies a location, geographical area, region, etc. of the requesting mobile device 132. Using such location information, the service 128 retrieves skywritings that correspond to the location information. For example, if the location information comprises coordinates, the service 128 may identify previously stored skywritings that are within a certain radius of the coordinates (the radius may be adjusted based on skywriting density, user preference, etc.). If the location information comprises indicia of a state, or county, or grid element, the service 128 retrieves skywritings that are associated with the same (or perhaps neighboring the same). In retrieving skywritings, the service 128 may apply various filters. For example, the service 128 may retrieve skywritings of less than a certain age, or only skywritings of a specific user ID, or skywritings having tags or metadata of some user-specified content, or only a certain number of the most recent skywritings, etc.

Having retrieved one or more virtual skywritings, the service 128, in one embodiment, identifies sky in the photo 136. Sky may be recognized by a combination of techniques, such as identifying colors typically found in the sky, searching for a large contiguous region of somewhat uniform color(s), etc. Additional details of sky recognition may be found in U.S. Pat. No. 7,336,819, entitled "Detection of sky in digital color images". See also Zafarifar and De With, "Blue sky detection for picture quality enhancement", in "Advanced concepts for intelligent vision systems" (Proceedings, 8th International conference, ACIVS 2006, Antwerp, Belgium, Sep. 18-21, 2006). By identifying the sky portion of the image 136, the service 128 is able to superimpose one or more virtual skywritings on the image 136/142 in a way that mimics authentic skywriting. That is, the virtual skywritings can be rendered onto the image 136/142 in a way that will appear as though the virtual skywritings are actually in the sky near the mobile device 132 [(see rendered virtual skywriting 100 in FIG. 1)]. Having rendered skywriting onto the image 136/142, the image 136/142 is returned to the mobile device 132 via communication network 126, where it is displayed.

In one embodiment, the mobile device 132 does not transmit an image with its skywriting request 138. Instead, the mobile device 132 transmits some indication that skywriting is desired, and the service 128 identifies nearby skywriting and transmits the skywriting back to the mobile device 132. The mobile device 132 then recognizes sky in an image on the device (preferably, an image recently captured with a still or video camera) and the mobile device renders the skywriting onto the sky portion of the image, which is then displayed. In another embodiment, the mobile device 132 transmits its image to the skywriting service 128, the skywriting service 128 analyzes the image to identify sky within. The skywriting service determines rendering parameters for fitting and/or rendering the skywriting into the sky region of the image. That is, the skywriting service performs preliminary steps for rendering the skywriting onto the image, for example, determining a scaling factor for the skywriting, perhaps a font type, a location in the image to put the skywriting, attributes of the skywriting such as age or vapor type or color, and so on. Then, rather than compositing the skywriting onto the image and returning the image to the mobile device, the skywriting service 128 returns the skywriting and the determined rendering parameters (but not the image). The mobile device 132 then uses the received rendering parameters and the skywriting itself to locally render the skywriting and composite or layer it onto the image. In yet another embodiment, the skywriting service renders the skywriting, for example, creating vapor-like graphics according to the skywriting (e.g., skywriting 100 but without the image 104), distorting or aging the skywriting, adding alpha blending data, rotating the skywriting, and so on. In other words, the skywriting service creates image data or pixels of the skywriting as intended to be displayed on the requesting mobile device. The skywriting service then returns the rendered skywriting along with, optionally, coordinate information for placing the rendered skywriting in the image. The mobile device then adds or blends the rendered skywriting onto the image at the location indicated by the skywriting service (or fits the skywriting according to local identification of sky). In sum, a number of approaches may be used to minimize the wireless transmission of image data.

Figure 3:
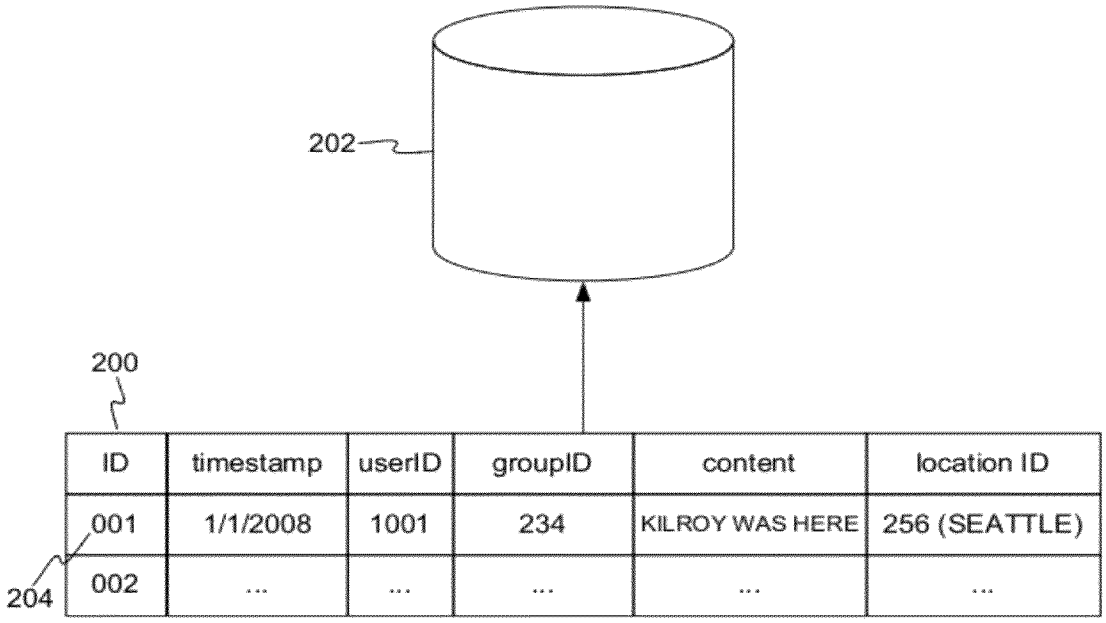
FIG. 3 shows [a general process for creating and displaying virtual skywriting] *an example of a table used by a skywriting service to store skywritings*.

[FIG. 3] *FIG. 2* shows a general process for creating and displaying virtual skywriting. Initially, a user creates 160 a virtual skywriting. This may be as simple as typing in text and sending it to a skywriting service. To add to the effect of virtual skywriting, in one embodiment virtual skywriting is created 160 by a user first taking an image of the local sky and then sketching the new skywriting onto the image, in effect virtually skywriting with a stylus or other input device. The skywriting can be extracted or maintained separately from the image for later rendering to other images. If the creator is sufficiently close to another receiving user who will ultimately view the new skywriting, the receiver may see a similar sky scene and thus skywritings can be fitted to the receiver's image of the sky in a way that mimics the in-situ originally authored skywriting. For example, the authoring user might draw a heart around a cloud, and knowing the arrangement of the skywriting relative to the sky, the skywriting may be fitted to the target image's sky by placing the skywriting around the same cloud in the target image. In other embodiments, the user may tag the skywriting with a descriptive phrase. In another embodiment, the user may designate a location for the skywriting (instead of associating the skywriting with the user's current location). For example, the user, although in Seattle, may designate that the skywriting's location is in Denver. As noted above, the base skywriting may be any of a variety of types of media, such as text, digital ink, image data, video data, etc.

Having created 160 the skywriting, the skywriting is transmitted 162 to a server, which stores 164 the skywriting. The transmission may include indicia of the location of the mobile device. This may be dynamically derived based on the actual current location of the mobile device. The mobile device creating 160 the skywriting may self-report its location (at the communication layer or higher), or the skywriting service may determine the device's location (e.g., from a GSM provider). The location information may also be statically derived. For example, the user who created 160 the skywriting may manually indicate that the user is by default at a particular zip code, and that zip code is used as the default location of the skywriting. The server may receive and store 166 skywritings created 160 by many different users at many different locations or areas.

Having accumulated skywritings and associated metadata such as locations, times of creation, etc., the server receives 166 a request from a client or mobile device user for skywriting. Such a request may or may not include an image taken by the requesting mobile device. The service identifies 168, from among the stored skywritings, skywriting within or associated with an area that matches (or is defined by) the location of the mobile device. As with the client devices that create 160 skywritings, the location or area of the requesting 166 mobile device may be obtained in a variety of ways. The skywriting service then transmits 170 the identified 168 skywriting to the requester. In an embodiment where the skywriting service does not composite the skywriting onto the sky portion of the image to be displayed, the transmitted 170 skywriting may be accompanied by optional metadata or parameters. For example, the transmission may include information about the age or time of creation of the skywriting, what color it is, who authored it, and so on. In another embodiment the skywriting service identifies a sky region in an image, adds the skywriting to the sky region, and transmits 170 the skywriting as part of the image. In another embodiment, the client is configured to identify 172 the sky region of an image (the image having been captured by the device at the device's current location), and the client renders 174 the skywriting onto the image which is then displayed on the device.

Figure 4:
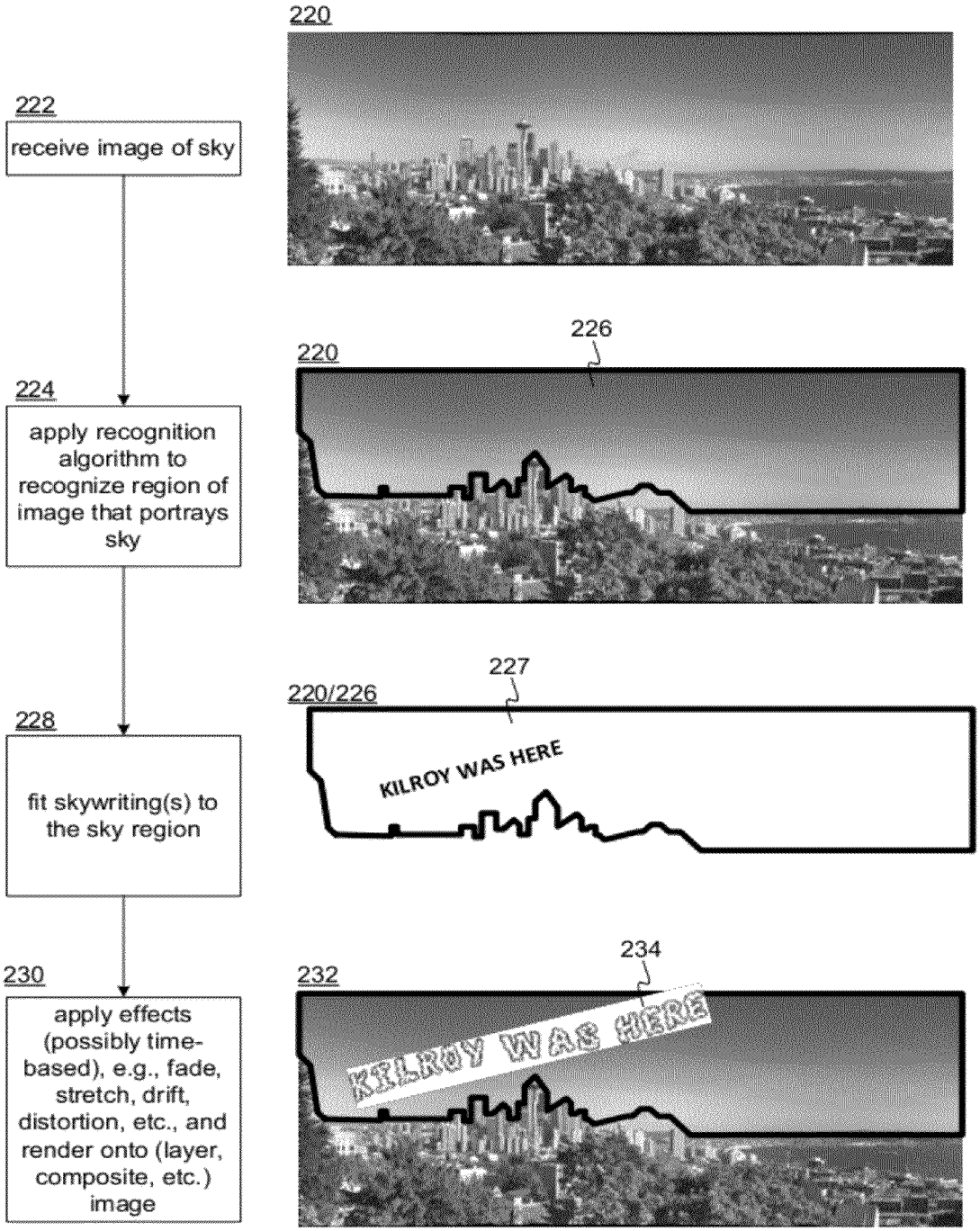
FIG. 4 shows [an example of a table used by] *a process of rendering* a skywriting [service to store skywritings] *onto an image*.

[FIG. 4] *FIG. 3* shows an example of a table 200 used or maintained by a skywriting service to store skywritings. The skywritings may be stored in a combination of tables also. For example, one table may contain user records, another table may contain location records, and another table may contain skywritings linked to the other tables. In any case, a data store or database 202 is provided to store the relevant table or tables. As seen in example table 200, a skywriting record 204 may include a number of fields such as an identifier (in the example of [FIG. 2] *FIG. 1*, skywriting 124 has ID "001"), a timestamp indicating either when the skywriting was authored or when it was added to the table 200, a userID of the user or mobile device that created the skywriting, content such as text or graphics, and indicia of the location of the skywriting. A groupID can be used to allow users to create things like friends lists or other groupings of users. When requesting skywriting, a user can specify one or more groupIDs, possibly in combination with other criteria for skywriting. The skywriting service will then filter the skywriting on such criteria. Again, the location information can take many forms, such as a name of a geographical place, an index pointing to a rectangle of a predefined grid, a longitude-latitude (and perhaps a radius), etc.

Figure 5:
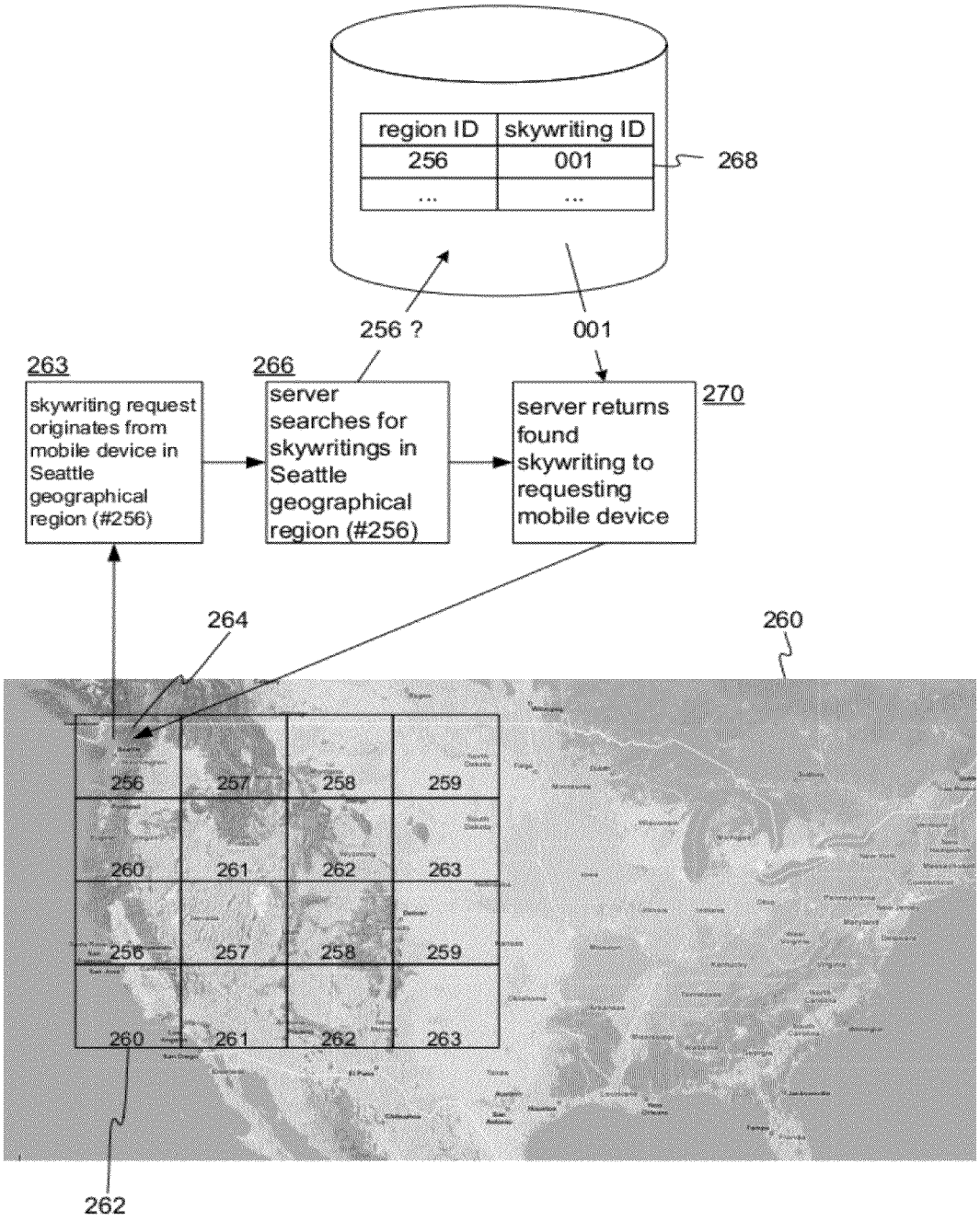
FIG. 5 shows [a process of rendering a skywriting onto an image] *how geographical locations can be used for providing virtual skywriting*.

[FIG. 5] *FIG. 4* shows a process of rendering a skywriting onto an image 220. The process of [FIG. 5] *FIG. 4* may be performed by the skywriting service or by the mobile device that is to display the skywriting, or a combination thereof. The process starts with receiving 222 the image 220. The image 220 may be received from an image capture device of the mobile device, or it may be received via network from the mobile device at the skywriting service. The process then applies 224 an algorithm to recognize a portion or region 226 of the image 220 that portrays sky. The sky region 226 can be recognized using color profiles, edge detection, cloud recognition, region of the image (photos tend to have sky toward their upper areas), and combinations thereof. The sky recognition algorithm may also be configured to detect patterns in the sky imagery. For example, distortions in jet trails may indicate wind patterns or cloud shapes may indicate wind direction, etc. This information, for example in the form of a two-dimensional vector field, can be applied to the skywriting to distort it in a realistic manner.

With the sky region 226 recognized and some skywriting 227 chosen, the skywriting 227 is then fitted 228 to the sky region 226 of the image 220. This may involve adjusting the size and orientation of the skywriting to fit within the region 226. Fitting 228 may also involve cropping a part of the skywriting to make it appear as though it is behind foreground objects, buildings, or landscape that presumably border the sky region 226. The skywriting 227 may also be fitted 228 by altering the image/region 220/226. For example, if the image 220 is large, the image may be enlarged and cropped to increase the size of the sky region 226 relative to the size of the image 220.

In addition to fitting 228 the skywriting 227, other affects may be applied 230 to cause the skywriting 227 to appear more realistic. For example, the skywriting 227 may be stretched, faded, translated from a prior position, distorted, etc. Such effects can be strengthened in proportion to the age of the skywriting (obtainable from its recorded timestamp). If the initial skywriting 227 is in the form of text, then a "cloud font" may be used to render the skywriting into a realistic form. In another embodiment, the skywriting, whether a graphic or text, is converted into something appearing like the vapor of actual skywriting formed by an aircraft. In one embodiment, the skywriting 227 may be formed into a short animation sequence in which various effects such as drift, fade, and distortion are animated to cause the skywriting 227 to change in a manner that mimics the decay of real clouds and skywriting. The skywriting 227 may be colored to match the average color of clouds in the sky region. The fitting 228 and applying 230 of effects can be performed together as one step or they may be performed in any order. The end result is an image 232 with fitted and stylized skywriting 234 composited onto the image 232. Alpha blending may be used to layer the skywriting onto the image 220. Finally, the image is transmitted to the mobile device (if the skywriting service is performing that part of the process of [FIG. 5] *FIG. 4*) and is displayed on the mobile device.

[FIG. 6] *FIG. 5* shows how geographical locations can be used for providing virtual skywriting. In the example of [FIG. 6] *FIG. 5*, a large area 260 is divided into a grid of geographical areas 262, each having a region identifier such as "256". The grid may be of greatly varying granularity, which may be adjusted according to factors such as how many skywritings are currently active globally, population density, etc. When a mobile device requests skywriting, suppose in area 264, the mobile device is identified as being in area 264 (region ID "256"). A server searches 266 table 268 for skywritings having region ID "256". In this example, skywriting ID "001" is found and returned. The skywriting ID is then used to find, in a table of skywriting data, the skywriting record having skywriting ID "001". This skywriting is returned 270 (either in raw or rendered form) to the requesting mobile device. As can be seen, mobile devices in different regions will receive and display skywritings that correspond to their respective current geographical regions/locations. Furthermore, given a sufficient size of the regions of the grid, mobile devices that are nearby may communicate with each *other* by authoring and viewing virtual skywriting, even though the mobile devices may be too far apart for the users thereof to see each other or see the same immediate scenery. As noted previously, other location schemes may be used, such as assigning geographical coordinates to skywritings (where skywritings are identified for a mobile device based on nearness to the device), or region information such as state, county, etc. may be used.

In conclusion, various embodiments described above can be used to allow users of mobile devices to "view" the sky with their mobile devices and see virtual skywriting authored by other users. The embodiments and features discussed above can be realized in the form of information stored in volatile or non-volatile computer or device readable media. This is deemed to include at least media such as optical storage (e.g., CD-ROM), magnetic media, flash ROM, or any current or future means of storing digital information in form (s) convenient for digital processing. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and featured can be performed on any type of computing device, including portable devices, workstations, servers, mobile wireless devices, and so on.

The invention claimed is:

1. A method implemented at least in part by a mobile computing device, the method comprising:

[transmitting from the mobile computing device a request to a skywriting service for skywriting;]

receiving from the skywriting service skywriting associated with a geographical location of the mobile computing device, the skywriting having been obtained by the skywriting service by identifying, among a stored plurality of skywritings, [a] *the* skywriting that corresponds to the geographical location of the mobile computing device; and displaying, on the mobile computing device, the skywriting superimposed on an image of the sky as captured by the mobile computing device from the geographical location, wherein the skywriting [is] *having been* superimposed on the image by *the mobile computing device transmitting the image captured by the imaging device to the skywriting service which* first [recognizing] *recognized* a region of sky in the image using a recognition algorithm and then [fitting] *fitted* the skywriting to the recognized region of sky*, and where the mobile computing device then received from the skywriting service the skywriting superimposed on the image.*

[2. A method according to claim 1, further comprising transmitting the image captured by the imaging device to the skywriting service, wherein the skywriting service performs the recognizing of the sky region and the superimposing, and receiving from the skywriting service the skywriting superimposed on the image.]

3. [A] *The* method according to claim 1, wherein the skywriting is inputted by a user using a mobile device, the skywriting being received at the skywriting service and stored in association with [a] *the* geographic location of the mobile device.

4. [A] *The* method according to claim 1, further comprising determining an age of the skywriting and rendering the skywriting with one or more visual effects that are based on the age of the sky writing.

5. [A] *The* method according to claim 1, further comprising selecting the skywriting from among the stored plurality of skywritings based at least in part on whether the skywriting has a grouping identifier that matches [a] *the* grouping identifier specified for the request, the grouping identifier identifying a plurality of users.

6. [A] *The* method according to claim 1, wherein the skywriting, when superimposed on the region of sky, appears as vapor in the region of sky.

7. One or more tangible computer readable storage media storing information to enable a computing device to perform a process, the process comprising:

receiving and storing skywritings inputted from respective mobile computing devices, the skywritings comprising text or graphic data, and storing with the skywritings indicia of respective geographical areas;

receiving requests from mobile devices requesting skywriting;

determining geographical areas from which the respective requests originated;

returning to one of the requesting mobile devices one of the stored skywritings based on the correspondence of its indicia of a geographical area to the geographical area from which the mobile device's request originated;

capturing an image at the geographical area with an image capture device of the one of the requesting mobile devices, *transmitting the image to a server, the server then* identifying a region of sky in the image and adding the skywriting to the image by fitting the skywriting [according] to the identified region of sky*, and receiving the image with the added skywriting at the one of the mobile devices*; and displaying the image with the added skywriting at the one of the requesting mobile devices.

8. One or more tangible computer readable storage media according to claim 7, further comprising rendering the skywriting to appear as vapor in the region of sky.

9. One or more tangible computer readable storage media according to claim 7, wherein a stored skywriting comprises respective time information indicating an age of the skywriting.

10. One or more tangible computer readable storage media according to claim 9, wherein the combining further comprises applying an effect to the skywriting, the effect depending on the age of the skywriting.

11. One or more tangible computer readable storage media according to claim 7, further comprising scaling the skywriting and/or the image to fit the skywriting to a region of the image containing pixels corresponding to sky.

12. One or more tangible computer readable storage media according to claim 7, further comprising selecting the skywriting returned to the requesting mobile device based on one or more properties of the skywriting other than the indicia of its geographical area.

13. A mobile computing device having wireless network access and configured to perform a process, the process comprising:

capturing a digital image of a real world scene including sky with an imaging device of the mobile computing device, the image being captured while the mobile computing device is in or near a geographical location;

while the mobile computing device is still in or near the geographical location, transmitting via the wireless network a request for virtual skywriting, wherein the transmitting enables a recipient of the request to determine the geographical location that the computing device is in or near;

receiving, via the wireless network, virtual skywriting having been selected in response to the request transmitted by the mobile computing device; and displaying a version of the digital image with the virtual skywriting added to the sky in the version of the digital image, the *virtual* skywriting having been added by [identifying] *transmitting the digital image to a server that then identifies* a portion of the digital image as containing sky image data and then [adding] *adds* the *virtual* skywriting according to the identified portion of the digital image*, the mobile computing device then receiving from the server the digital image with the added virtual skywriting image*.

14. [A] *The* mobile computing device according to claim 13, the process further comprising receiving the virtual skywriting in rendered form and using the rendered *virtual* skywriting to generate the version of the digital image.

15. [A] *The* mobile computing device according to claim 13, the process further comprising authoring a new skywriting and transmitting [it] *the new skywriting* via the wireless network to [a] *the* skywriting service that makes the new skywriting available to mobile devices in or near the computing device's geographical location.

16. [A] *The* mobile computing device according to claim 13, the receiving the virtual skywriting further comprising receiving rendering parameters for the virtual skywriting and the mobile computing device rendering the virtual skywriting according to the rendering parameters.

17. [A] *The* mobile computing device according to claim 13, the process further comprising the mobile device transmitting with the request *an* indicia of the geographical location.

18. [A] *The* mobile computing device according to claim 13, wherein the *virtual* skywriting has also been selected based on whether the *virtual* skywriting is associated with a specified user list.

*19. The method of claim 1, comprising transmitting from the mobile computing device a request to the skywriting service for the skywriting.*

* * * * *